INVENTOR.
William S. Wolfram
BY Hugh L. Fisher
ATTORNEY

INVENTOR.
William S. Wolfram
BY
Hugh L. Fisher
ATTORNEY

Oct. 23, 1962     W. S. WOLFRAM     3,059,493
DRIVE SYSTEMS Filed June 8, 1959     5 Sheets-Sheet 5

INVENTOR.
William S. Wolfram
BY Hugh L. Fisher
ATTORNEY

United States Patent Office 3,059,493
Patented Oct. 23, 1962

3,059,493
DRIVE SYSTEMS
William S. Wolfram, Birmingham, Mich., assignor to General Motors Corporation, Detroit, Mich., a corporation of Delaware
Filed June 8, 1959, Ser. No. 818,886
21 Claims. (Cl. 74—336.5)

This invention relates generally to drive systems and particularly to drive systems adapted for driving internal combustion engine accessories.

Because of the increased number of accessories, such as power steering, power brakes, air conditioning, etc., being installed on motor vehicles, the accessory load on the engine has become a problem. With all of this power equipment, the required extra pumps and compressors in addition to the usual accessories, e.g., fuel and water pumps, generators and fans, now consume a substantial portion of the available power for propelling the vehicle. Also, there is the need for driving each of these accessories at or close to their respective optimum speeds, for it is these optimum speeds that must be carefully considered if efficient results are to be obtained.

With the foregoing in mind, it is proposed by the present invention to provide an accessory drive system that drives the various accessories at speeds approximating optimum, that reduces the accessory load as the engine speed increases, and that makes maximum use of standard equipment.

More specifically, it is the aim of the invention to drive by the foregoing system the accessories through plural drive trains, one proceeding directly from the engine to an accessory drive member and the other from the engine to the accessory drive member via the engine camshaft. Additionally, a novel speed responsive arrangement is utilized to determine which drive train is to be effective.

In carrying out the invention according to one form thereof, two drive trains are interposed between a vehicle engine crankshaft and an accessory drive member. One of the drive trains includes a clutch that is normally engaged to afford a direct connection between the crankshaft and the accessory drive member. The other of the drive trains extends from the engine camshaft, which is also driven by the crankshaft, to the accessory drive member through a one-way drive connection. As a result, when the clutch is disengaged, the one-way drive connection becomes effective, and drive is delivered to the accessory drive member from the camshaft at a slower speed than when the clutch is engaged.

To disengage the clutch, fluid pressure derived from the lubrication system is utilized and is transferred to an expansible chamber motor for the clutch by a centrifugally actuated valve. At some predetermined speed, the valve will open and the lubrication pressure will disengage the clutch thereby rendering the low speed drive train effective.

The foregoing and other objects and advantages of the invention will be apparent from the following description and the following drawings in which.

Figure 1:
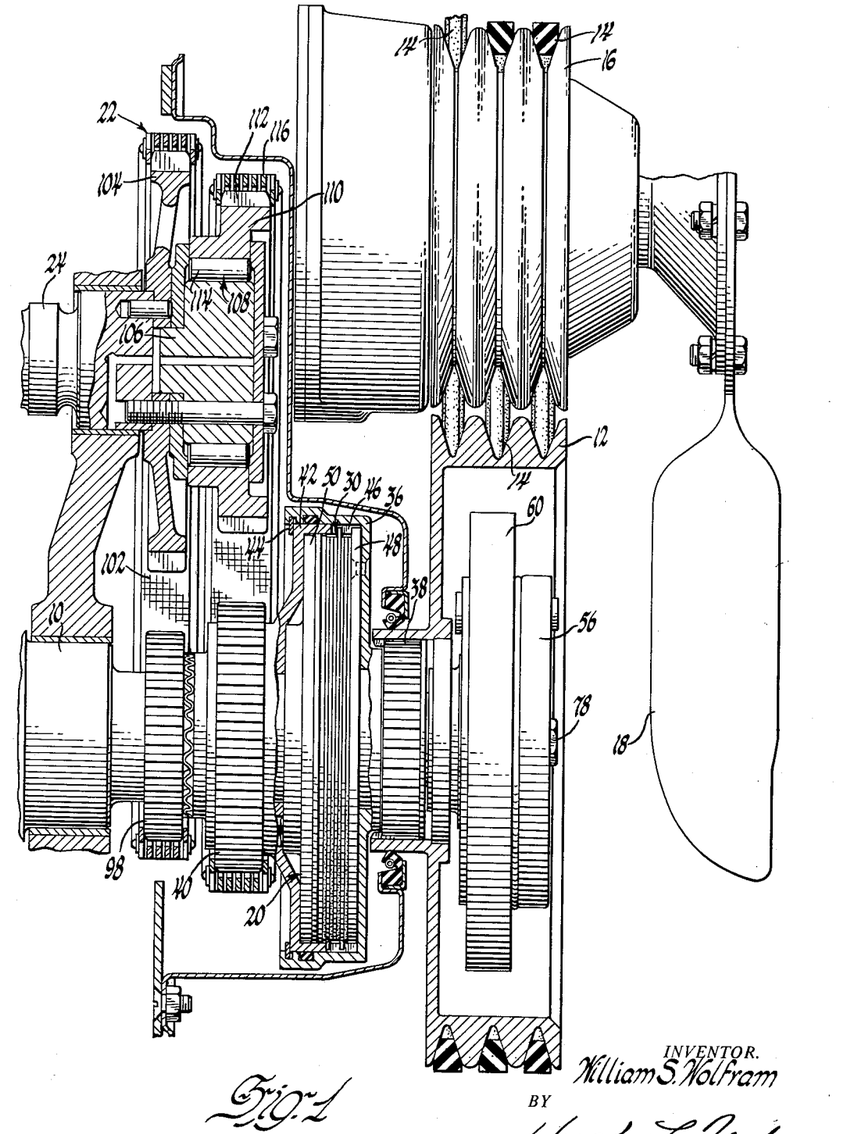
FIGURE 1 is a sectional view of an accessory drive system incorporating the principles of the invention.

Referring to the drawings, the numerals 10 and 12 denote respectively a crankshaft driven by the engine (not shown) and an accessory drive pulley. The accessory drive pulley 12 transfers drive through belts 14 to the various driven pulleys (not shown) for the accessories such as a generator, pumps, compressors, etc. The belts 14 in the FIGURE 1 embodiment extend around an idler pulley 16 shown coaxial with the engine driven fan 18 in a known manner. In between the crankshaft 10 and the accessory drive pulley 12 are two drive trains; one, a high speed drive train, is viewed generally at 20 in FIGURE 2 and affords a direct drive connection between the crankshaft 10 and the accessory drive pulley 12; the other, a low speed drive train, designated generally at 22 in FIGURE 1, provides a reduced speed ratio and extends between the crankshaft 10 and the accessory drive pulley 12 via a countershaft as camshaft 24.

Figure 2:
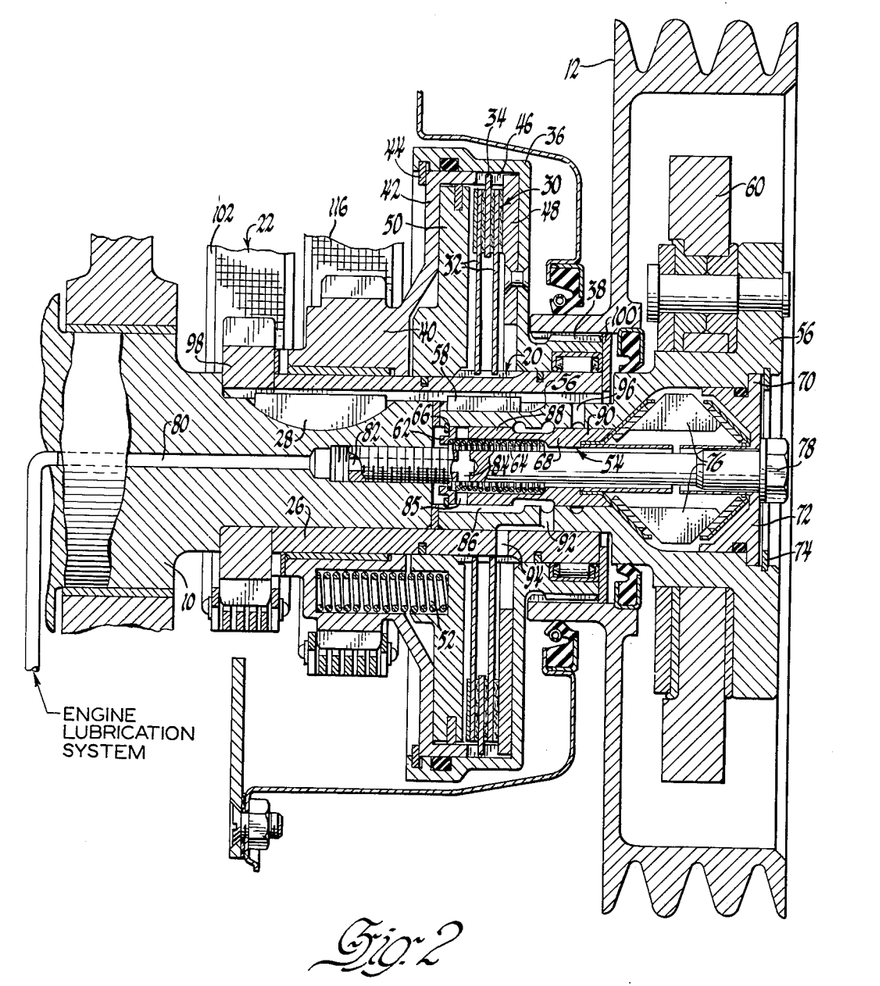
FIGURE 2 is a detailed sectional view of the FIGURE 1 structure.

Considering first the high speed drive train 20 in FIGURE 2, this train includes a drive sleeve 26 positioned on the end of the crankshaft 10 and is drive connected thereto by a key 28. For connecting the drive sleeve 26 to the accessory drive pulley 12, a multiple disk clutch 30 is employed. Clutch 30 has one or more drive plates 32 splined to the drive sleeve 26 and a driven plate 34 enclosed by a clutch housing 36 that is splined at 38 to the accessory drive pulley 12. At the left end of the clutch housing 36, a camshaft driven gear 40 is revolvably supported on the drive sleeve 26 and has a drive flange 42 positioned within the open end of the clutch housing 36 and fixed axially relatively thereto by a retainer ring 44. A series of teeth 46 on the drive flange 42 engage similar teeth on both the clutch driven plate 34 and a ring 48 attached to the clutch housing 36. Also positioned within the clutch housing 36 is a piston 50 urged to the engaged position by a series of springs 52 interposed between the camshaft driven gear 40 and the piston 50. The clutch drive and driven plates 32 and 34 and the piston 50 are all disposed within the fluid-tight enclosure provided by the clutch housing 36 and the drive flange 42 so that when subjected to fluid pressure as will be explained, the piston 50 will be moved to the viewed clutch disengaged position.

For supplying this fluid pressure to the clutch 30, a valve mechanism depicted generally at 54 is employed. The mechanism 54 includes a valve housing 56 secured to the inside of the drive sleeve 26 by a key 58 and arranged so as to carry therewith at the outside and right end thereof a suitable vibration dampener 60. Slidable within the valve housing 56 is a spool type control valve 62 urged towards an inoperative or closed position by a spring 64 that abuts a retainer 66 fixed with respect to the valve housing 56.

To render the control valve operation speed responsive, a guide flange 68 is formed on the right end of the control valve 62 so as to confront a similar guide flange 70 on a cover 72 positioned axially relative to the valve housing 56 by a retainer ring 74. Between these two guide flanges 68 and 70, weights 76 are situated so that upon a predetermined rotary speed of the crankshaft 10, these weights 76 will move outwardly and force the valve 62 to the viewed operative or open position. The entire assemblage is attached to the end of the crankshaft 10 by a stud 78, which may be formed in appropriately attached separate parts as required.

Fluid pressure for disengaging the clutch 30 is preferably derived from the lubrication system for the engine and is delivered to the clutch 30 via a route comprising in sequence an axial passage 80 in the crankshaft 10, a bore 82 in the stud 78, a cross-passage 84 in the stud 78 communicating with the stud axial passage 82, a radial passage 85 in the valve 62, an axial passage 86 in the valve housing 56, the groove between the control valve lands 88 and 90, a radial passage 92 in the valve housing 56, and a radial passage 94 in the drive sleeve 26, assuming that the valve 62 is in the open position viewed. If the valve 62 is in the closed position, then the fluid pressure within the clutch 30 is returned to a sump via various lubrication channels by an exhaust passage 96 in the valve housing 56.

Now considering the low speed drive train, reference is made to FIGURE 1 as well as FIGURE 2. As shown, a crankshaft drive gear 98 is secured to the crankshaft 10 by the key 28 and is positioned axially thereon between the drive sleeve 26 and a spacer 100, which spacer 100 fixes the relative positions of the accessory drive member 12 and the valve housing 56. Drive from the crankshaft drive gear 98 is transferred by a suitable chain 102 to a crankshaft driven gear 104 attached to the end of the camshaft 24. Also positioned on the end of the camshaft 24 and revolvable therewith is an inner race 106 for a one-way device 108. An outer race 110 for the one-way device 108 is formed preferably integral with a camshaft drive gear 112. Appropriate one-way elements 114 such as rollers, sprags, or the equivalent, are interposed between the races 106 and 110 in a well known manner so as to permit relative rotation between the races 106 and 110 in one direction only. The crankshaft driven gear 104 is connected to the camshaft driven gear 40 by another suitable chain 116.

In this embodiment, the one-way device 108 becomes operative or engaged when the clutch 30 is disengaged and inoperative or unlocked when the clutch 30 is engaged. Hence, the arrangement of the one-way elements 114 is such that the outer race 110 is allowed to overspeed relative to the inner race 106.

To summarize the operation of the embodiment viewed in FIGURES 1 and 2, it is assumed that the engine has just been started. Because the valve mechanism 54 will be inoperative until a predetermined engine speed is attained, which, for exemplary purposes only, may be equivalent to 50 m.p.h. of the vehicle, the clutch 30 is engaged. With the clutch 30 engaged, the direct connection between the crankshaft 10 and the accessory drive pulley 12 is effective with drive proceeding from the crankshaft 10 through the drive sleeve 26, clutch 30, drive flange 42, ring 48, and the clutch housing 36 to the drive pulley 12. The relative sizes of the drive pulley 12 and the other pulleys for the accessories may be such that these accessories are driven at a speed approximating the optimum operating speed, and therefore, they would preferably be driven at a faster speed than crankshaft idle speed. In the meantime, the one-way device 108 is unlocked since the outer race 110 will be overdriven with respect to the inner race 106, and the low speed drive train 22 will be ineffective.

At the 50 m.p.h. vehicle speed suggested, the centrifugal force acting on the weights 76 will be adequate to move these weights 76 outwardly and move the control valve 62 to the viewed open position. Fluid pressure from the lubrication system will now be delivered to the clutch 30 and force the piston 50 to the disengaged position illustrated in which the clutch 30 will be disengaged and the high speed drive train 20 interrupted. Consequently, the outer race 110 of the one-way device 108 will slow down until the one-way device 108 locks, at which time the low speed drive train 22 will become effective with drive proceeding from the crankshaft 10 to the camshaft 24 through one-way device 108 and back to the accessory drive pulley 12 via camshaft driven gear 40 and the clutch housing 36.

The arrangement of the gears on the crankshaft 10 and the camshaft 24 is such that the accessory drive pulley 12 will be driven at a slower speed than when the drive train 20 was effective. In this way, then the speed of the accessories will be reduced, this being possible since the crankshaft speed will have built up to that required to propel the vehicle at 50 m.p.h. As can be seen, the accessories are overdriven initially and up to approximately the 50 m.p.h. vehicle speed, and thereafter, this driven speed of the accessories can be reduced as much as 50% or more, thereby reducing the power needed to drive the accessories as well as increasing their life. Moreover, by initially overdriving the accessories, their capacity at low speeds is substantially increased by the suggested 50%, which is particularly desirable when driving an air conditioning compressor since the resultant refrigeration effect is increased a proportionate amount.

Figure 3:
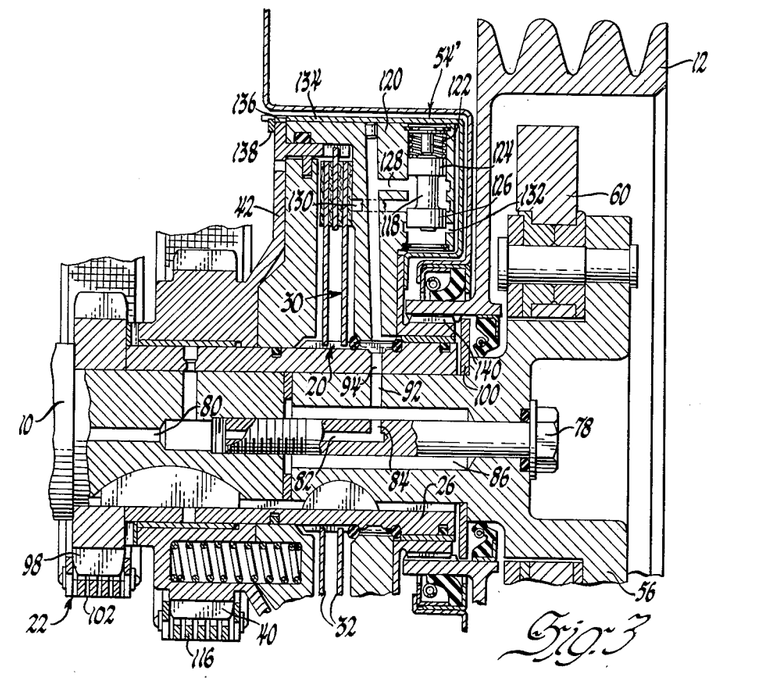
FIGURE 3 is a sectional view of a modification.
Figure 4:
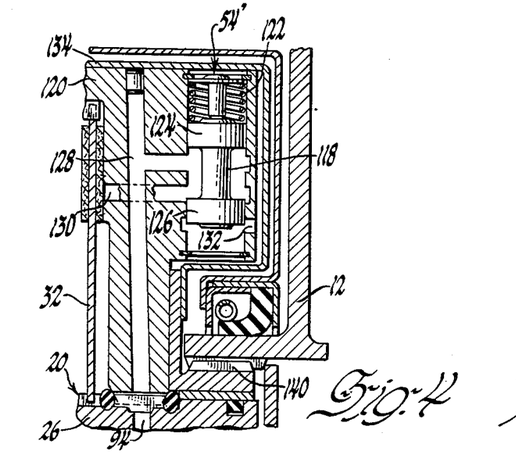
FIGURE 4 is an enlarged partial sectional view of a centrifugally operated valve for the FIGURE 3 modification.

In FIGURES 3 and 4, a modified valve mechanism viewed at 54' is illustrated and comprises a control valve 118 situated in a radial bore formed in a valve housing 120. Valve housing 120 is revolvable with the drive sleeve 26, and accordingly at crankshaft speed so that at some predetermined speed, the bias from a spring 122 will be overcome and the valve 118 moved upwardly to the open position depicted. Communication, as a result, will be established by valve lands 124 and 126 between an inlet passage 128 from the lubrication system and an outlet passage 130 to the clutch 30. When the control valve 118 is in the inoperative position, the outlet passage 130 communicates with an exhaust passage 132. The valve housing 120 is enclosed by a clutch housing 134 that is drive connected to the drive flange 42 at 136 and fixed axially with respect thereto by a retainer ring 138. At the opposite end, the clutch housing 134 is splined to the accessory drive pulley 12 at 140. The remaining parts of the structure for the FIGURES 3 and 4 modification are the same as previously described with respect to FIGURES 1 and 2, and therefore this modification will function in the same described manner with the clutch 30 engaged up to 50 m.p.h. so as to render the high speed drive train 20 effective and thereafter disengaged so as to render the slow drive train 22 effective.

Figure 5:
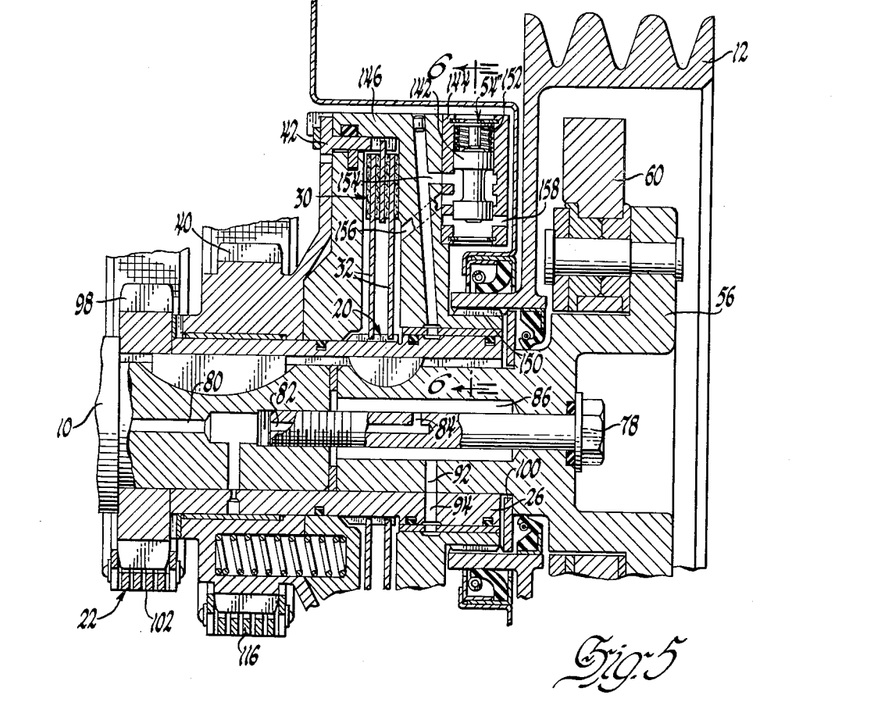
FIGURE 5 is a sectional view of another modification.
Figure 6:
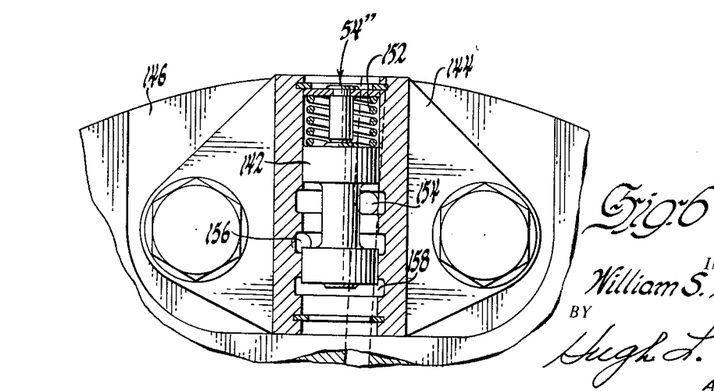
FIGURE 6 is an enlarged partial sectional view of a centrifugally operated valve for the FIGURE 5 modification.

Still another modification very similar to that just described in FIGURES 3 and 4, is demonstrated in FIGURES 5 and 6. The valve mechanism 54" viewed in FIGURES 5 and 6 is responsive to the speed of the accessory drive pulley 12, whereas the valve mechanism 54' was responsive to crankshaft speed. In this modification, a control valve 142 is slidable within a radial bore in a valve body 144 attached to a clutch housing 146. Clutch housing 146 is at the forward or viewed left end connected to and axially positioned relative to the drive flange 42 on the camshaft driven gear 40 and is at the rear end splined to the drive pulley 12 at 150. A spring 152 urges the control valve 142 radially inwardly thus interrupting communication between an inlet passage 154 and an outlet passage 156 and establishing communication between the inlet passage 154 and an exhaust passage 158. The function of this control valve 142 is such that in the viewed position, fluid pressure from the lubrication system is delivered via inlet passage 154 to the clutch 30 and causes the clutch 30 to disengage if the speed of the drive pulley 12 is adequate to induce this movement of the control valve 142. If the speed of the accessory drive member 12 is not adequate, then the clutch 30 will be spring engaged and the high speed drive train 20 will be effective. As with the FIGURE 3 modification, the remaining parts are the same as those described in FIGURES 1 and 2.

Figure 7:
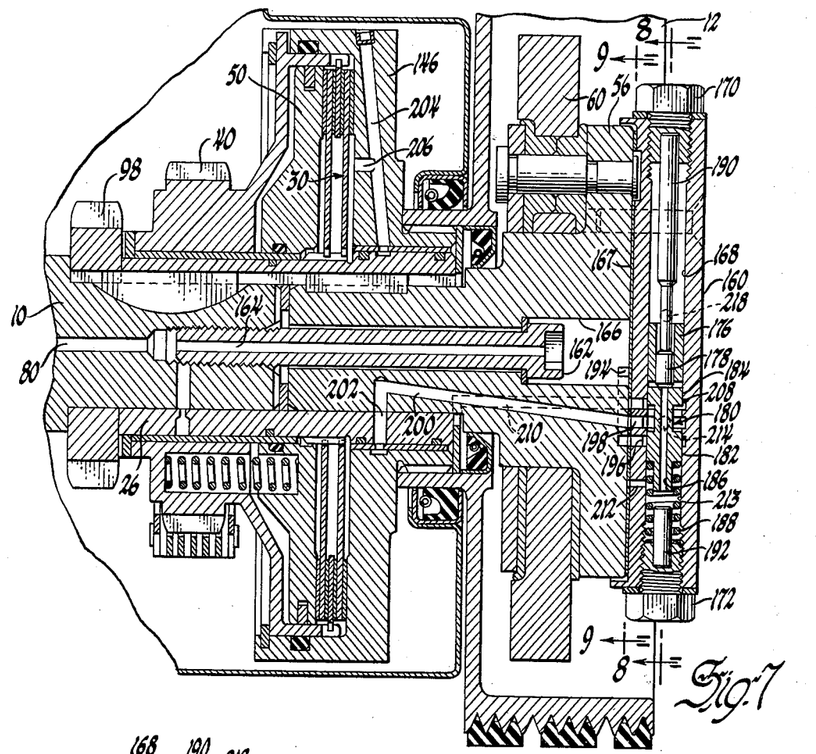
FIGURE 7 is a sectional view of still another modification.
Figure 8:
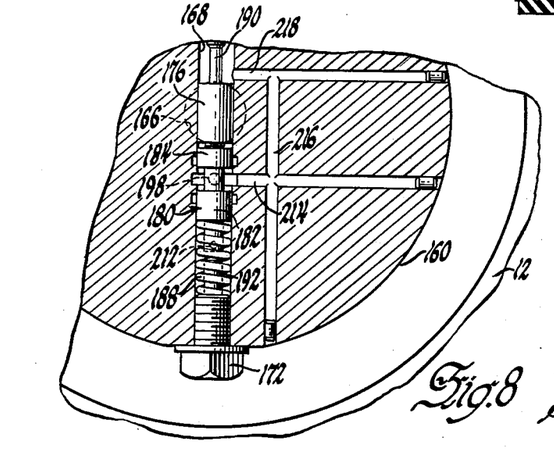
FIGURE 8 is a partial sectional view of the control valve for the FIGURE 7 modification taken along line 8—8 of FIGURE 7.
Figure 9:
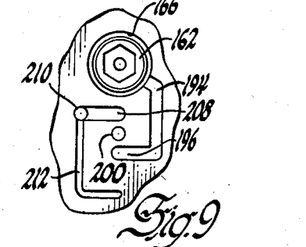
FIGURE 9 is a fragmentary view of pressure fluid passages for the control valve taken in the direction of arrows 9—9 in FIGURE 7.

The modification depicted in FIGURES 7, 8, and 9 is similar to the embodiments shown in FIGURES 1 and 2 and FIGURES 3 and 4 in that each is sensitive to the speed of the crankshaft 10. Therefore, similar parts have been assigned the same numerals.

Referring particularly to FIGURE 7, the numeral 160 denotes generally an annular valve body that is bolted or otherwise attached to the housing 56 and the housing 56 is in turn secured to the end of the crankshaft 10 by elongated stud bolt 162 much in the manner of the embodiments in the FIGURES 1 and 2 and the FIGURES 3 and 4 embodiments. The stud bolt 162 has a central passage 164 therein that communicates at one end with the axial passage 80 in the crankshaft 10 and at the other end with a chamber 166 formed in the end of the housing 56. The adjacent faces of the housing 56 and the valve body 160 are separated by a gasket 167 that has appropriate openings therein for the transfer of fluid between passages in the housing 56 and the valve body 160 as will become apparent.

The valve body 160 is provided with a through radial bore 168 that is sealed at opposite ends by plugs 170 and 172. At the approximate mid-point of the bore 168, a sleeve is fixedly positioned and slidably houses a valve extension 178. This valve extension 178 is axially aligned and positioned adjacent a control valve denoted at 180. The control valve is of the spool type formed with spaced lands 182 and 184 and has a central passage 186 extending therethrough. A spring 188 urges the control valve 180 against the valve extension 178, which in turn abuts an elongated stop pin 190 secured to plug 170. Movement of the control valve 180 in the opposite direction, i.e., downwardly as viewed in FIGURE 7, is limited by a short stop pin 192 secured to the plug 172.

Pressure fluid delivered to the chamber 166 is transferred by an inlet passage 194 in the face of the housing 56 through an opening in the gasket 167 to an inlet port 196 in the valve body bore 168. In the depicted position of the control valve 180, the land 182 blocks this inlet port 196 so that pressure fluid cannot be transferred beyond this point. An outlet port 198, which communicates via an opening in the gasket 167, an outlet passage 200 in the housing 56, a passage 202 in the drive sleeve 26, and passages 204 and 206 in the clutch housing 146 with the fluid tight enclosure adjacent piston 50, is aligned in this viewed position of the control valve 180 with an exhaust port 208. Exhaust port 208 communicates through the gasket 167 with an exhaust passage 210 so arranged as to cause exhausted fluid to be delivered back to the sump for the lubrication system. Opposite ends of the control valve 180 are also connected to the exhaust passage 210 via a drain passage 212 that communicates both with the spring pocket 213 and the exhaust passage 210 as best seen in FIGURE 9.

To explain the operation of the control valve 180, it will first be assumed that the speed of the crankshaft 10 is such that the control valve 180 will be in the FIGURE 7 position. Then, as mentioned, the land 182 will block communication between the inlet passage 194 and the outlet passage 200 while permitting communication between the exhaust passage 210 and the outlet passage 200. Hence, the clutch 30 will not be subjected to any fluid pressure and will be spring engaged for a direct drive ratio between the crankshaft 10 and the drive pulley 12. Upon attainment of a predetermined speed, previously suggested as being 50 m.p.h., the corresponding centrifugal force will move the control valve 180 radially outwardly and the lands 182 and 184 will now align the inlet port 196 with the outlet port 198 while the communication between the outlet port 198 and exhaust port 208 is interrupted. As a result, pressure fluid will be delivered by inlet passage 194 to the outlet passage 202 and then consecutively through passages 202, 204, and 206 to the clutch 30 and effect a disengagement. This will render the low speed drive train 22 effective with drive being transferred from the crankshaft 10 to the camshaft 24, through one-way device 108 and back to the accessory drive pulley 12 via camshaft driven gear 40 and clutch housing 146.

Because there can be a so-called hunting effect if the engine speed is varying in the vicinity of the selected transition speed of 50 m.p.h., i.e., varying above and below this speed, the control valve 180 could alternate between the two positions producing continuous and undesired clutch engagement and disengagement. Provision is made in accordance with another objective of the invention to cause the control valve to downshift at a different point than it upshifts. This is commonly known as "hysteresis effect" and is accomplished by supplying pressure fluid via passages 214, 216, and 218 (see FIGURE 8) to the end area of the valve extension 178 opposite that engaging the control valve 180. This pressure fluid acting on the valve extension 178 will aid centrifugal force in holding the control valve 180 in the outermost position corresponding to the clutch disengaged position. Hence, the speed of the crankshaft 10 must decrease a predetermined amount below that at which the control valve 180 moved to its outermost position before the control valve 180 can return to the clutch engaged position. By way of example only, this difference between the upshift and downshift values may be between four and five hundred engine r.p.m., which means that the clutch will disengage at an engine speed of between four and five hundred r.p.m. greater than it will reengage.

The just described modification in FIGURES 7, 8, and 9 in addition to having the "hysteresis effect" discussed also is advantageous in that the valve body 160 is made accessible for repair and calibration by being at the terminal end of the housing 56; consequently, quick repairs can be made without removing the entire assemblage.

The invention is to be limited only by the following claims:

1. In combination, input and output members, an input member driven countershaft, plural drive trains for transferring drive between the input and output members, one of the drive trains including a clutch engageable in one range of speeds so as to drive connect the input and output members and thereby establish one drive ratio therebetween and disengageable in another range of speeds, motor means for actuating the clutch, another of the drive trains including a one-way drive connection between the countershaft and the output member so arranged as to cause drive to be transferred from the countershaft to the output member when the clutch is disengaged and thereby drive the output member in another drive ratio, and speed responsive valve means so arranged as to cause, in response to a predetermined speed of one of the members, the motor means to disengage the clutch.

2. In combination, input and output members, an input member driven countershaft, plural drive trains between the input and output members, one of the drive trains including a clutch engageable to directly connect the input and output members so as to establish a direct drive ratio therebetween, another of the drive trains including a one-way drive connection between the countershaft and the output member arranged so as to cause drive to be transferred from the countershaft to the output member when the clutch is disengaged and thereby drive the output member in another drive ratio, an expansible chamber motor including an engaging spring for maintaining the clutch engaged, and a centrifugally operated valve so arranged as to connect in response to a predetermined speed of one of the members the expansible chamber motor to a fluid pressure source and thereby cause the clutch to be disengaged.

3. In an engine, the combination of an engine driven crankshaft member, a crankshaft member driven camshaft, an accessory drive member, plural drive trains interposed between the engine crankshaft member and the accessory drive member, one of the drive trains including means for connecting the crankshaft member and the accessory drive member so as to establish one drive ratio therebetween, another of the drive trains including a one-way drive connection between the camshaft and the accessory drive member so arranged as to cause, when the crankshaft member and the accessory drive member are disconnected by the means, drive to be transferred via the camshaft to the accessory drive member and thereby cause the accessory drive member to be driven at another drive ratio, and motor means for rendering said one drive train effective over one range of speeds and said another of the drive trains effective over another range of speeds in response to the speed of one of the members.

4. In an engine, the combination of an engine driven crankshaft member, a crankshaft member driven camshaft, an accessory drive member, and plural drive trains interposed between the crankshaft member and accessory drive member, one of the drive trains including a clutch engageable to provide a direct connection between the crankshaft member and the accessory drive member so as to establish a direct drive ratio therebetween and speed responsive means so arranged as to disengage the clutch above a predetermined speed of one of the members, another of the drive trains including a one-way drive connection between the camshaft and the accessory drive member so arranged as to cause drive to be transferred from the camshaft to the accessory drive member when the clutch is disengaged and thereby drive the accessory drive member at another drive ratio.

5. In an engine, the combination of an engine driven crankshaft member, a crankshaft member driven camshaft, an accessory drive member, and plural drive trains interposed between the engine crankshaft member and the accessory drive member, one drive train including a centrifugally operated clutch so arranged as to be disengaged in response to a predetermined speed of one of the members, the clutch when engaged causing the crankshaft member and accessory drive member to be directly connected and thereby establish a direct drive ratio therebetween, another of the drive trains including a one-way drive connection between the camshaft and the accessory drive member so arranged as to cause drive to be transferred from the camshaft to the accessory drive member when the clutch is disengaged and thereby drive the accessory drive member at another speed ratio.

6. In combination, input and output members, an input member driven countershaft, plural drive trains between the input and output members, one of the drive trains including a clutch engageable to directly connect the input and output members so as to establish a direct drive ratio therebetween, another of the drive trains including a one-way drive connection between the countershaft and the output member arranged so as to cause drive to be transferred from the countershaft to the output member when the clutch is disengaged and thereby drive the output member in another drive ratio, an expansible chamber motor including an engaging spring for maintaining the clutch engaged, and a centrifugally operated valve so arranged as to connect in response to a predetermined speed of the input member the expansible chamber motor to a fluid pressure source and thereby cause the clutch to be disengaged.

7. In an engine, the combination of an engine driven crankshaft, a crankshaft driven camshaft, an accessory drive member, and plural drive trains interposed between the engine crankshaft and the accessory drive member, one drive train including a centrifugally operated clutch so arranged as to be disengaged in response to a predetermined speed of the crankshaft, the clutch when engaged causing the crankshaft and accessory drive member to be directly connected and thereby establish a direct drive ratio therebetween, another of the drive trains including a one-way drive connection between the camshaft and the accessory drive member so arranged as to cause drive to be transferred from the camshaft to the accessory drive member when the clutch is disengaged and thereby drive the accessory drive member at another speed ratio.

8. In an engine, the combination of an engine driven crankshaft, a crankshaft driven camshaft, an accessory drive member, and plural drive trains interposed between the crankshaft and accessory drive member, one of the drive trains including a clutch engageable to provide a direct connection between the crankshaft and the accessory drive member so as to establish a direct drive ratio therebetween and speed responsive means so arranged as to disengage the clutch above a predetermined speed of the crankshaft member, another of the drive trains including a one-way drive connection between the camshaft and the accessory drive member so arranged as to cause drive to be transferred from the camshaft to the accessory drive member when the clutch is disengaged and thereby drive the accessory drive member at another drive ratio.

9. In an engine having a lubrication system, the combination of an engine driven crankshaft, a crankshaft driven camshaft, an accessory drive member, slow and fast speed drive trains for transferring drive between the engine crankshaft and the accessory drive member, the fast speed drive train including a clutch engageable to provide a direct connection between the crankshaft and the accessory drive member so as to establish a direct drive ratio therebetween, the slow speed drive train including a one-way drive connection between the camshaft and the accessory drive member so arranged as to cause drive to be transferred from the camshaft to the accessory drive member when the clutch is disengaged and thereby drive the accessory drive member at a reduced speed, an expansible chamber motor for actuating the clutch, the expansible chamber motor including an engaging spring for maintaining the clutch engaged, and a centrifugally operated valve so arranged as to connect in response to a predetermined speed of the crankshaft the expansible chamber motor to the lubrication system and thereby cause the clutch to be fluid pressure disengaged.

10. In combination, input and output members, an input member driven countershaft, plural drive trains between the input and output members, one of the drive trains including a clutch engageable to directly connect the input and output members so as to establish a direct drive ratio therebetween, another of the drive trains including a one-way drive connection between the countershaft and the output member arranged so as to cause drive to be transferred from the countershaft to the output member when the clutch is disengaged and thereby drive the output member in another drive ratio, an expansible chamber motor including an engaging spring for maintaining the clutch engaged, and a control valve including weights revolvable at a speed proportional to the speed of the input member, the weights being so arranged as to cause in response to a predetermined speed of the input member the control valve to connect the expansible chamber motor to a fluid pressure source and thereby cause the clutch to be disengaged.

11. In an engine having a lubrication system, the combination of an engine driven crankshaft, a crankshaft driven camshaft, an accessory drive member, slow and fast speed drive trains for transferring drive between the engine crankshaft and the accessory drive member, the fast speed drive train including a clutch engageable to provide a direct connection between the crankshaft and the accessory drive member so as to establish a direct drive ratio therebetween, the slow speed drive train including a one-way connection between the camshaft and the accessory drive member so arranged as to cause drive to be transferred from the camshaft to the accessory drive member when the clutch is disengaged and thereby drive the accessory drive member at a reduced speed, an expansible chamber motor for actuating the clutch, the expansible chamber motor including an engaging spring for maintaining the clutch engaged, a conduit for interconnecting the lubrication system and the expansible chamber motor, a control valve for controlling pressure fluid flow through the conduit, and centrifugal weights revolvable with the crankshaft and coacting with the valve so as to cause in response to a predetermined speed of the crankshaft fluid pressure to be delivered to the expansible chamber motor and thereby cause the clutch to be disengaged.

12. In combination, input and output members, an input member driven countershaft, plural drive trains between the input and output members, one of the drive trains including a clutch engageable to directly connect the input and output members so as to establish a direct drive ratio therebetween, another of the drive trains including a one-way drive connection between the countershaft and the output member arranged so as to cause drive to be transferred from the countershaft to the output member when the clutch is disengaged and thereby drive the output member in another drive ratio, an expansible chamber motor including an engaging spring for maintaining the clutch engaged, and a centrifugally operated valve so arranged as to connect in response to a predetermined speed of the output member the expansible chamber motor to a fluid pressure source and thereby cause the clutch to be disengaged.

13. In an engine, the combination of an engine driven crankshaft, a crankshaft driven camshaft, an accessory drive member, and plural drive trains interposed between the crankshaft and accessory drive member, one of the drive trains including a clutch engageable to provide a direct connection between the crankshaft and the accessory drive member so as to establish a direct drive ratio therebetween, and speed responsive means so arranged as to disengage the clutch above a predetermined speed of the accessory drive member, another of the drive trains including a one-way drive connection between the camshaft and the accessory drive member so arranged as to cause drive to be transferred from the camshaft to the accessory drive member when the clutch is disengaged and thereby drive the accessory drive member at another drive ratio.

14. In an engine, the combination of an engine driven crankshaft, a crankshaft driven camshaft, an accessory drive member, and plural drive trains interposed between the engine crankshaft and the accessory drive member, one drive train including a centrifugally operated clutch so arranged as to be disengaged in response to a predetermined speed of the accessory drive member, the clutch when engaged causing the crankshaft and accessory drive member to be directly connected and thereby establish a direct drive ratio therebetween, another of the drive trains including a one-way drive connection between the camshaft and the accessory drive member so arranged as to cause drive to be transferred from the camshaft to the accessory drive member when the clutch is disengaged and thereby drive the accessory drive member at another speed ratio.

15. In an engine having a lubrication system, the combination of an engine driven crankshaft, a crankshaft driven camshaft, an accessory drive member, slow and fast speed drive trains for transferring drive between the engine crankshaft and the accessory drive member, the fast speed drive train including a clutch engageable to provide a direct connection between the crankshaft and the accessory drive member so as to establish a direct drive ratio therebetween, the slow speed drive train including a camshaft driven element drive connected to the accessory drive member and a one-way connection between the camshaft and the accessory drive member so arranged as to cause drive to be transferred from the camshaft to the accessory drive member when the clutch is disengaged and thereby drive the accessory drive member at a reduced speed, an expansible chamber motor for actuating the clutch, the expansible chamber motor including an engaging spring for maintaining the clutch engaged, and a centrifugally operated valve so arranged as to connect in response to a predetermined speed of the accessory drive member the expansible chamber motor to the lubrication system and thereby cause the clutch to be fluid pressure disengaged.

16. In combination, input and output members, an input member driven countershaft, plural drive trains for transferring drive between the input and output members, one of the drive trains including a centrifugally operated clutch engageable in one range of speeds so as to drive connect the input and output members and thereby establish one drive ratio therebetween and disengageable in another range of speeds, another of the drive trains including a one-way drive connection between the countershaft and the output member so arranged as to cause drive to be transferred from the countershaft to the output member when the clutch is disengaged and thereby drive the output member in another drive ratio, and means for causing the transition between said one drive ratio and said another drive ratio to occur at different speeds determined by whether the speed of one of the members is increasing or decreasing.

17. In an engine, the combination of an engine driven crankshaft member, a crankshaft member driven camshaft, an accessory drive member, plural driven trains interposed between the crankshaft member and accessory drive member, one of the drive trains including a clutch engageable to provide a direct connection between the crankshaft member and the accessory drive member so as to establish a direct drive ratio therebetween and speed responsive means so arranged as to disengage the clutch above a predetermined speed of one of the members, another of the drive trains including a one-way drive connection between the camshaft and the accessory drive member so arranged as to cause drive to be transferred from the camshaft to the accessory drive member when the clutch is disengaged and thereby drive the accessory drive member at another drive ratio, and means coacting with the speed responsive means so as to cause the clutch to re-engage at a speed of a selected amount different from the predetermined speed of said one of the members at which the clutch is disengaged.

18. In an engine having a lubrication system the combination of an engine driven crankshaft, a crankshaft driven camshaft, an accessory drive member, slow and fast speed drive trains for transferring drive between the engine crankshaft and the accessory drive member, the fast speed drive train including a clutch engageable to provide a direct connection between the crankshaft and the accessory drive member so as to establish a direct drive ratio therebetween, the slow speed drive train including a camshaft driven element drive connected to the accessory drive member and a one-way connection between the camshaft and the accessory drive member so arranged as to cause drive to be transferred from the camshaft to the accessory drive member when the clutch is disengaged and thereby drive the accessory drive member at a reduced speed, an expansible chamber motor for actuating the clutch, the expansible chamber motor including an engaging spring for maintaining the clutch engaged, a centrifugally operated valve so arranged as to connect in response to a predetermined speed of the crankshaft the expansible chamber motor to the lubrication system and thereby cause the clutch to be fluid pressure disengaged, and means coacting with the valve so as to cause the clutch to be re-engaged at a crankshaft speed different from the predetermined speed at which the clutch is disengaged.

19. In an engine having a lubrication system, the combination of an engine driven crankshaft, a crankshaft driven camshaft, an accessory drive member, slow and fast speed drive trains for transferring drive between the engine crankshaft and the accessory drive member, the fast speed drive train including a clutch engageable to provide a direct connection between the crankshaft and the accessory drive member so as to establish a direct drive ratio therebetween, the slow speed drive train including a camshaft driven element drive connected to the accessory drive member and a one-way connection between the camshaft accessory drive member so arranged as to cause the drive to be transferred from the camshaft to the accessory drive member when the clutch is disengaged and thereby drive the accessory drive member at a reduced speed, an expansible chamber motor for actuating the clutch, the expansible chamber motor including an engaging spring for maintaining the clutch engaged, a centrifugally operated valve so arranged as to connect in response to a predetermined speed of the crankshaft the expansible chamber motor to the lubrication system and thereby cause the clutch to be fluid pressure disengaged, and means coacting with the valve so as to cause the clutch to be re-engaged at a crankshaft speed different from the predetermined speed at which the clutch is disengaged.

20. In combination, input and output members, a countershaft arranged to be continuously driven by the input member, plural drive trains for transferring drive between the input and output members, one of the drive trains including a clutch engageable in one range of speed so as to directly connect the input and output members so as to establish a direct drive ratio therebetween and disengageable in another range of speeds, motor means for actuating the clutch, another of the drive trains including a one-way drive connection between the countershaft and the output member so arranged as to cause drive to be transferred from the countershaft to the output member when the clutch is disengaged and thereby drive the output member by the countershaft in another drive ratio, and speed responsive valve means so arranged as to cause, in response to a predetermined speed of one of the members, the motor means to disengage the clutch.

21. In an engine, the combination of an engine driven crankshaft member, a camshaft arranged to be continuously driven by the crankshaft member, an accessory drive member, plural drive trains interposed between the engine crankshaft member and the accessory drive member, one of the drive trains including means connecting the crankshaft member directly to the accessory drive member so as to establish one direct drive ratio therebetween, another of the drive trains including a one-way drive connection between the camshaft and the accessory drive member so arranged as to cause, when the crankshaft member and the accessory drive member are disconnected by the means, drive to be transferred from the camshaft to the accessory drive member and thereby cause the accessory drive member to be driven by the crankshaft member via the camshaft at another drive ratio, and motor means rendering said one drive train effective over one range of speeds and said another drive train effective over another range of speeds in response to the speed of one of the members.

References Cited in the file of this patent

UNITED STATES PATENTS

| | | |
|---|---|---|
| 2,496,937 | Edwards | Feb. 7, 1950 |
| 2,802,370 | Benzin | Aug. 13, 1957 |
| 2,860,519 | Cavanaugh | Nov. 18, 1958 |
| 2,866,349 | Heckethorn | Dec. 30, 1958 |
| 2,903,083 | Kelley | Sept. 8, 1959 |
| 2,910,891 | Heckethorn | Nov. 3, 1959 |